US011622095B1

(12) United States Patent
Karri et al.

(10) Patent No.: US 11,622,095 B1
(45) Date of Patent: Apr. 4, 2023

(54) TECHNOLOGY FOR ASSISTANCE WITH A VIEW OBSTRUCTED BY A USERS HAND

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/481,763

(22) Filed: Sep. 22, 2021

(51) Int. Cl.
| | |
|---|---|
| H04N 9/31 | (2006.01) |
| G01S 15/89 | (2006.01) |
| G01S 7/62 | (2006.01) |
| G08B 21/02 | (2006.01) |
| H04N 5/247 | (2006.01) |
| G06K 9/62 | (2022.01) |
| G06V 20/10 | (2022.01) |

(52) U.S. Cl.
CPC .......... *H04N 9/3173* (2013.01); *G01S 7/629* (2013.01); *G01S 15/89* (2013.01); *G06K 9/6201* (2013.01); *G06V 20/10* (2022.01); *G08B 21/02* (2013.01); *H04N 5/247* (2013.01)

(58) Field of Classification Search
None
See application file for complete search history.

(56) References Cited

U.S. PATENT DOCUMENTS

| | | |
|---|---|---|
| 8,519,971 B1 | 8/2013 | Mackraz |
| 2016/0127624 A1 | 5/2016 | Woo |
| 2019/0238808 A1 | 8/2019 | Bostick |
| 2019/0294300 A1* | 9/2019 | Kline ............. H04W 76/10 |
| 2019/0369736 A1* | 12/2019 | Rakshit ........... G03H 1/0005 |
| 2022/0008252 A1* | 1/2022 | Donnini ............ A61F 9/08 |
| 2022/0100265 A1* | 3/2022 | Kies ............. G06F 3/0485 |

FOREIGN PATENT DOCUMENTS

CN 104243882 B 6/2018

OTHER PUBLICATIONS

NIST Special Publication 800-145 The NIST Definition of Cloud Computing, Peter Mell, et al., Computer Security Division, Information Technology Laboratory, National Institute of Standards and Technology, Gaithersburg, MD 20899-8930, Sep. 2011, http://csrc.nist.gov/groups/SNS/cloud-computing/index.html.

* cited by examiner

*Primary Examiner* — Eileen M Adams
(74) *Attorney, Agent, or Firm* — Anthony V. S. England; Steven Bouknight; Susan M. Maze

(57) ABSTRACT

For assistance viewing an object, a computer system receives first data from a first sensor sensing an object when a user's view of at least a portion of the object is obstructed by a hand of the user. The first sensor is fixed to a first wearable device. The computer system generates an image of the obstructed portion of the object in response to the first data. An image of the obstructed portion of the object is projected onto a surface within a view of the user.

20 Claims, 8 Drawing Sheets

TECHNOLOGY FOR ASSISTANCE WITH A VIEW OBSTRUCTED BY A USERS HAND

BACKGROUND

The present invention relates to detecting a user's obstructed view, and more specifically, to an object obstructed from the user's view due to the user's hand.

SUMMARY

A computer system implemented method for assistance viewing an object includes receiving, by a computer system, first data from a first sensor sensing an object when a user's view of at least a portion of the object is obstructed by a hand of the user. The first sensor is fixed to a first wearable device. The computer system generates an image of the obstructed portion of the object in response to the first data. An image of the obstructed portion of the object is projected onto a surface within a view of the user.

In other embodiments of the invention, other forms are provided, including a system and a computer program product.

BRIEF DESCRIPTION OF THE DRAWINGS

Features and advantages of the present invention will be more readily understood with reference to the attached figures and following description, wherein.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
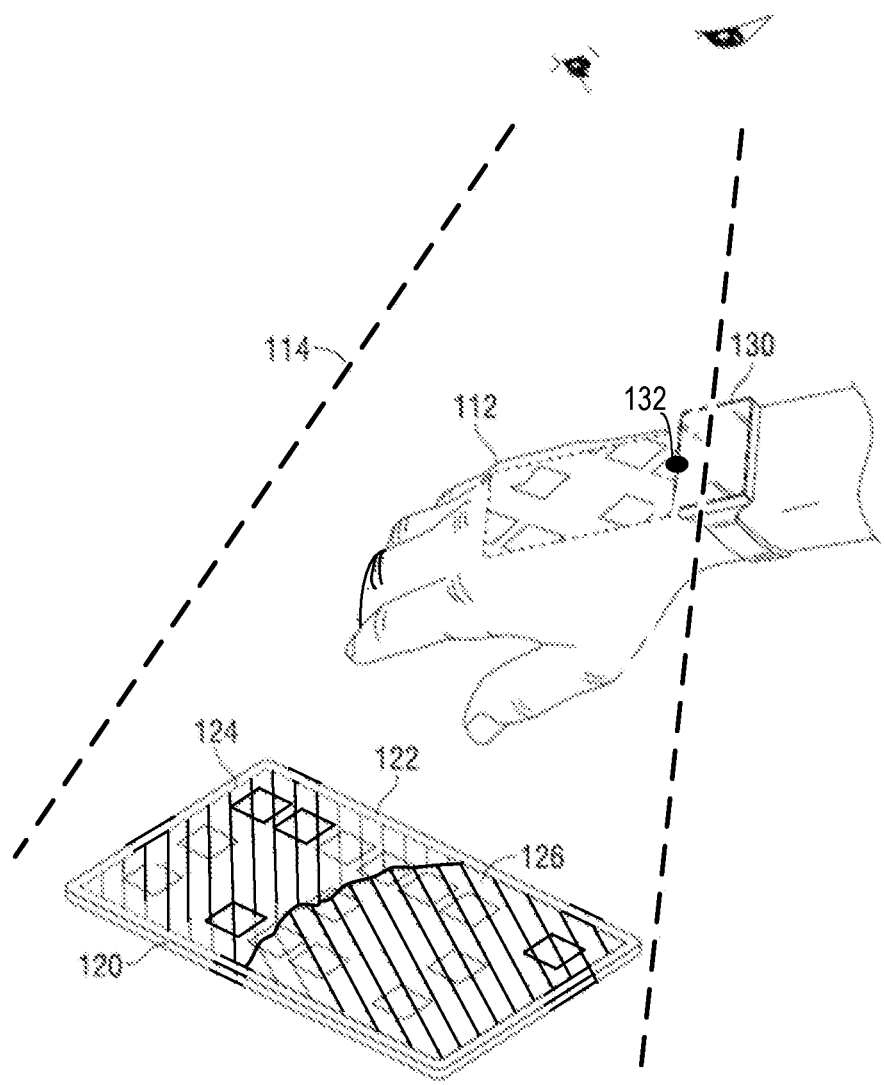
FIG. 1 illustrates an example of a system that includes a touch-based display, such as for a touch-screen, according to at least one embodiment of the present invention.

Referring to FIG. 1, a first device 120—a tablet-type computer system as shown, for example, or some other type of computer system—includes a touch-based display 122, such as for a touch-screen. When interacting with display 122, e.g., typing, drawing or otherwise touching information such as an icon, image and/or text (referred to herein as "display content 124" or merely "content 124"), a user's body part 112 may sometimes obstruct part 126 of the user's view 114 of content 124. (For convenience, body part 112 may be referred to herein as "hand" 112, although it should be understood that it may be any part of the user's body, such as the user's hand, wrist, arm, etc. or any combination thereof.) One or more software modules (not shown in FIG. 1) may be added to first device 120 and configured to determine the obstructed part 126 of display content 124 when device 120 detects the user is interacting with display 122.

A second device 130 is worn by a user, such as on a wrist band 134 of user's hand 112. One or more of the added software modules may be configured to communicate information from device 120 to device 130 identifying the obstructed part 126 of display content 124. In response, a projector 132 of device 130 projects an image 116 of the obstructed part 126 of display content 124, such as onto the back of hand 112, as shown.

Figure 2:
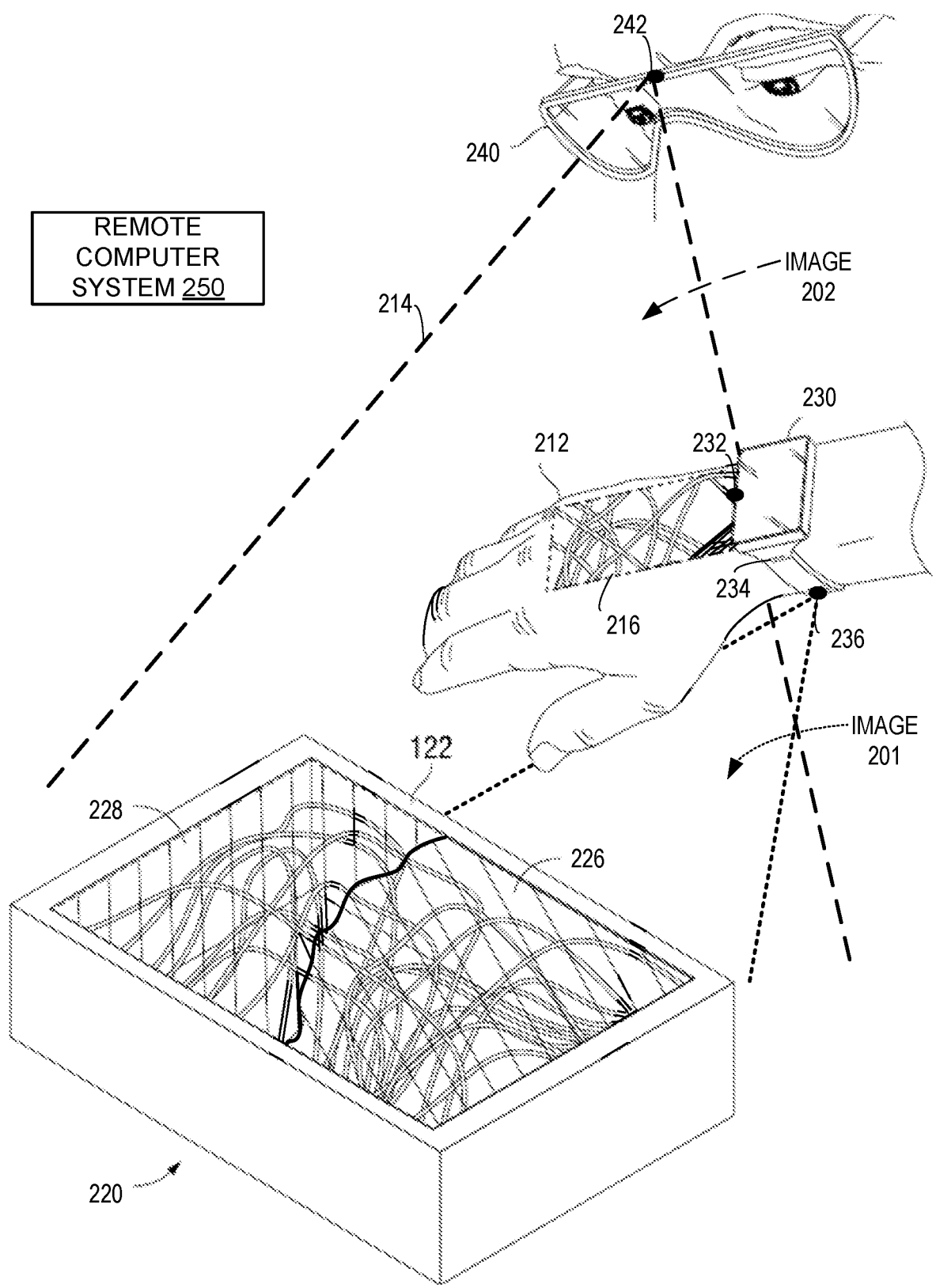
FIG. 2 illustrates a system configured for a context, among others, wherein a portion of an object is obstructed from a user view, but the object does not include a display, according to at least one embodiment of the present invention.

Referring now to FIG. 2, an embodiment of the present invention is shown that is configured for a context, among others, wherein a portion 226 of an object 220 is obstructed from a user view 214, but object 220 does not include a display, so that this may be referred to as a "non-display" embodiment. For such an embodiment of the present invention, a system 200 is provided, which includes a device 230 (worn by a user on a wrist band 234), smart glasses 240 worn by the user, and a computer system 250, which may be referred to as "remote computer system 250" because it is not necessarily worn by the user. System 200 projects an image 216 of obstructed portion 226 onto a surface the user can view without obstruction, such as the back of user's hand 212 via a projector 234 of device 230, which may include a smart watch and may, therefore, also be referred to herein as "smart watch 230."

In one way for obtaining and projecting image 216, visual spectrum camera 236 is included in smart watch 230 fixed in a position that is proximate to object 220, such as on a part of wrist band 234 facing object 220, as shown. Camera 236 captures a first image 201 showing at least the obstructed portion 226 of object 220. Another image 202 corresponding to the user's eye view 214 is captured from further away and shows an unobstructed part 228 of object 220 but not obstructed part 226. (For example, image 202 may be obtained from a camera 242 of smart glasses 240 worn by the user who is wearing smart watch 230 on the user's hand 212.) Then, a part of image 201 that corresponds to the obstructed part 226 of object 220 is determined and provided as another image 216 by comparing images 201 and 202. The comparing indicates what is shown in image 201 but not shown in image 202, which is the obstructed part 226 of object 220.

To perform the comparing, etc., images 201 and 202 may be sent by their respective devices 230 and 240 to remote computer system 250 configured to perform the identification of what is shown in image 201 but not image 202 to responsively generate image 216 and send it to smart watch 230 for projecting. Alternatively, smart watch 230 may be configured to perform the image comparing, identifying and generating, in which case image 202 may be sent by smart glasses 240 to smart watch 230, which generates image 216 and projects it. In yet another alternative, smart glasses 240 may be configured to perform the image comparing, identifying and generating, in which case image 201 may be sent by smart watch 230 to smart glasses 240, and then smart glasses 240 may send generated image 216 to smart watch 230 to project image 216.

Figure 3:
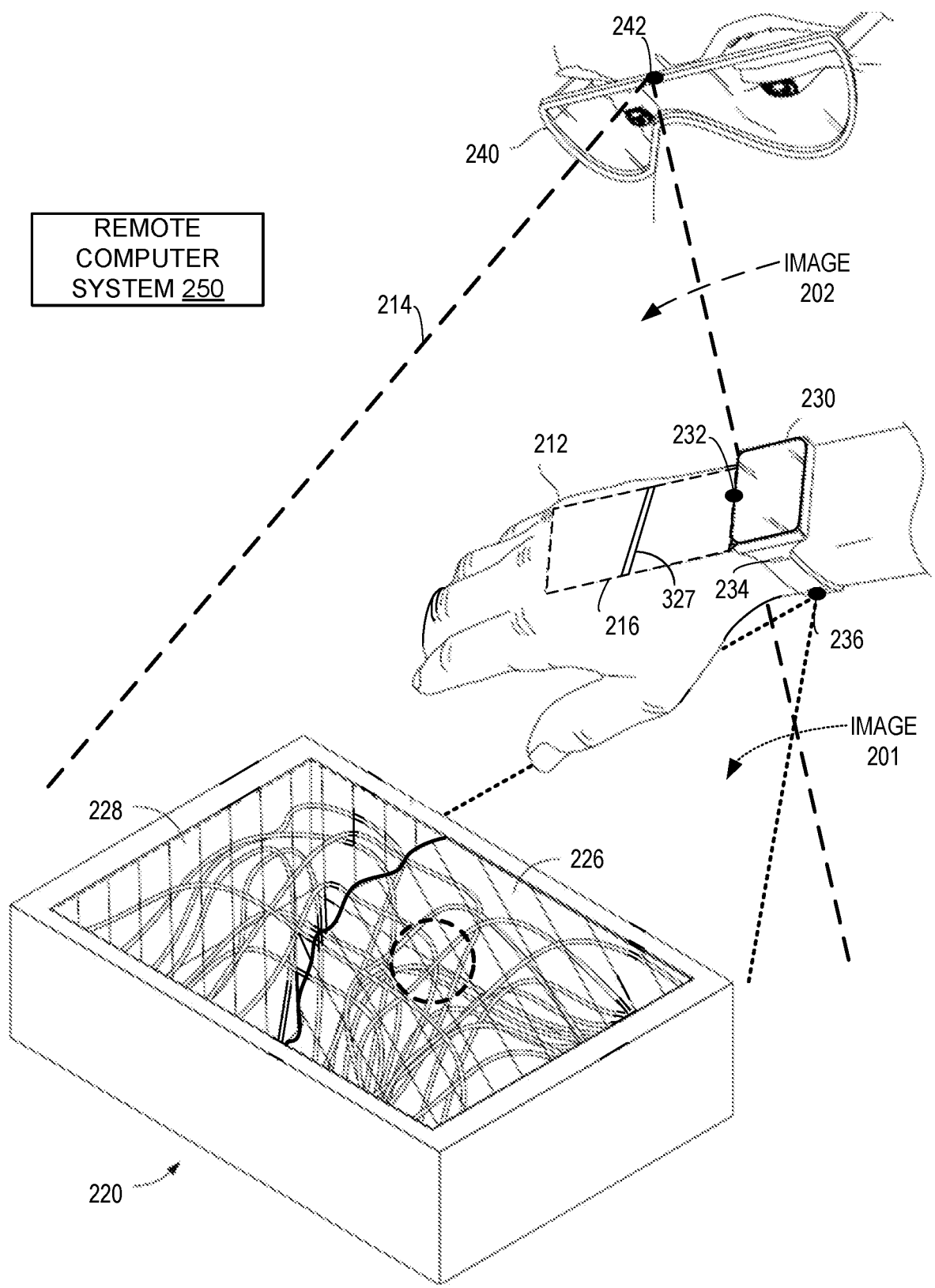
FIG. 3 illustrates a device configured to perform a warning action based on analysis of an obstructed part, according to at least one embodiment of the present invention.

Referring now to FIG. 3, in one embodiment of the present invention, device 230 is configured to not only project image 216 of obstructed part 226 as described herein above but is also configured to perform a warning action based on analysis of obstructed part 226, which may be done by system 200 analyzing one or more of images 201, 202 and 216, by direct analysis of data from sensor(s) of one or more of device 230 and 240, or by both image and sensor analysis.

The analysis determines whether part 226 obstructed from user's view 214 poses a hazard, i.e., whether part 226 could potentially cause injury to the user. For example, part 226 may pose a hazard because it includes a bare conductor as shown in portion 327, whereas the rest of the conductors nearby are insulated. Likewise, part 226 may pose a hazard if includes one or more portions 327 that are sharp, extremely hot or cold, energized at a high voltage, or moving (e.g., rotating or vibrating at high frequency), for example. Accordingly, device 230 may include sensors known in the art to remotely detect shape, temperature, voltage level and movement, including vibration and rotation. (The term "sensor" herein may include a device, such as a camera, that not only senses, but also processes sensor data, such as to enhance or normalize what is sensed, and provides processed sensor data.)

More specifically, one or more of images 201, 202 and 216 may be analyzed by a computer program executing in one or more of device 230, device 240 and remote computer system 250, wherein the program is configured to detect any hazard in obstructed part 226 such as described herein above. Also, or alternatively, data from sensors of one or more of device 230 and device 240 may be analyzed by a computer program executing in one or more of device 230, device 240 and remote computer system 250, wherein the program is configured to detect, via the sensor data, any hazard in obstructed part 226 such as described herein above.

In one aspect, the user is warned if the analysis detects a hazard, which may be by any one or more warning actions performed by device 230, device 240 or both, including, for example, generating a vibration, an audible sound, and projecting something different on the back of hand 212, which may be any one or more of a warning icon on image 216 (FIG. 2), a flashing version, a brighter version and a different than normal color version of image 216, for example. In one alternative, device 230 projects as image 216 only hazardous portion 327 of obstructed part 226. In one alternative, device 230 projects image 216 of obstructed part 226 (or of hazardous portion 327) onto the back of hand 212 only if part 226 includes something hazardous. In one alternative, device 230 projects image 216 only if the user requests device 230 to project image 216, such as in user response to an audible warning by device 230 or device 240, for example.

Figure 8:
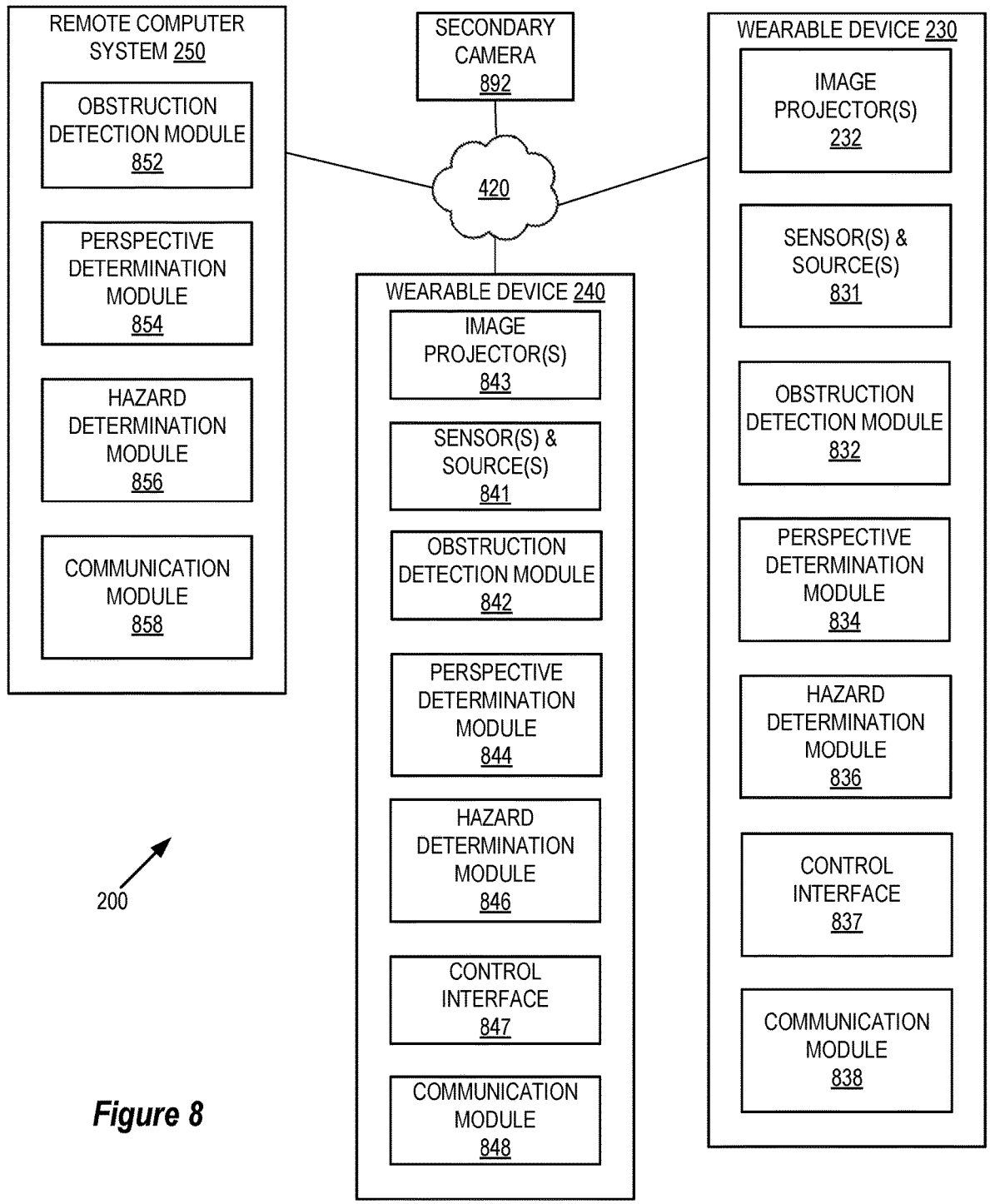
FIG. 8 is a block diagram of a system which includes a remote computer system and wearable devices, according to at least one embodiment of the present invention.

FIG. 8 shows system 200, according to one or more embodiments of the present invention, which includes remote computer system 250 and wearable devices 230 and 240. System 200 may also include secondary sensors (and associated program modules) 892, such as cameras, for example. All of these elements 230, 240, 250 and 892 are configured to communicate with one another via a network 850, which may be any suitable communication network or combination of networks, such as a local area network (LAN), a general wide area network (WAN), and/or a public network (e.g., the Internet). In one or more embodiment, network 850 includes a Bluetooth network over which communication occurs. (It should be understood that elements in system 200 of FIG. 8 are not limited to what is shown in FIG. 8. In practice, system 200 of FIG. 8 may include additional elements, fewer elements, different elements or differently arranged elements.)

Device 230 may be in the form of a ring, a bracelet, a smartwatch, or other computer device suitable for wearing near the user's hand that has hardware and program modules configured to perform functions described or illustrated herein. In at least one embodiment, device 230 has program modules, hardware and program modules associated with the hardware, including image projector(s) 232 (e.g., micro projector(s) or pico projector(s)), sensors 831, obstruction detection module 832, perspective determination module 834, hazard determination module 836 and communication module 838 configured for communicating over network 850. Device 230 also includes a control interface that has a microphone, a speaker, a vibrator and a computer program module for generating hazard warning vibration and sounds and for detecting and responding to voice commands from the user, including requests to project image 216. (It should be understood that device 230 may include additional elements, fewer elements, different elements or differently arranged elements.)

Device 240 may be in the form of a head mounted device, such as a device affixed to a headband on the user's forehead or a device affixed to or built into glasses worn over the user's eyes, for example, and that has hardware and program modules configured to perform functions described or illustrated herein. It should be appreciated that in addition to the functions of device 240 explicitly described herein, such as herein above in connection with FIGS. 2 and 3, certain functions described herein above for device 230 may, alternatively, be suitable for performance by device 240. Accordingly, device 240 may have program modules, hardware and program modules associated with the hardware that are similar to that of device 230. For example, in at least one embodiment device 240 includes image projector(s) 243 (e.g., micro projector(s) or pico projector(s)), sensors 841, obstruction detection module 842, perspective determination module 844, hazard determination module 846 and communication module 848 configured for communicating over network 850. Like device 230, device 240 may also include a control interface that has a microphone, a speaker, a vibrator and a computer program module for generating hazard warning vibration and sounds and for detecting and responding to voice commands from the user, including requests to project an image 216. (It should be understood that device 250 may include additional elements, fewer elements, different elements or differently arranged elements.)

Figure 5:
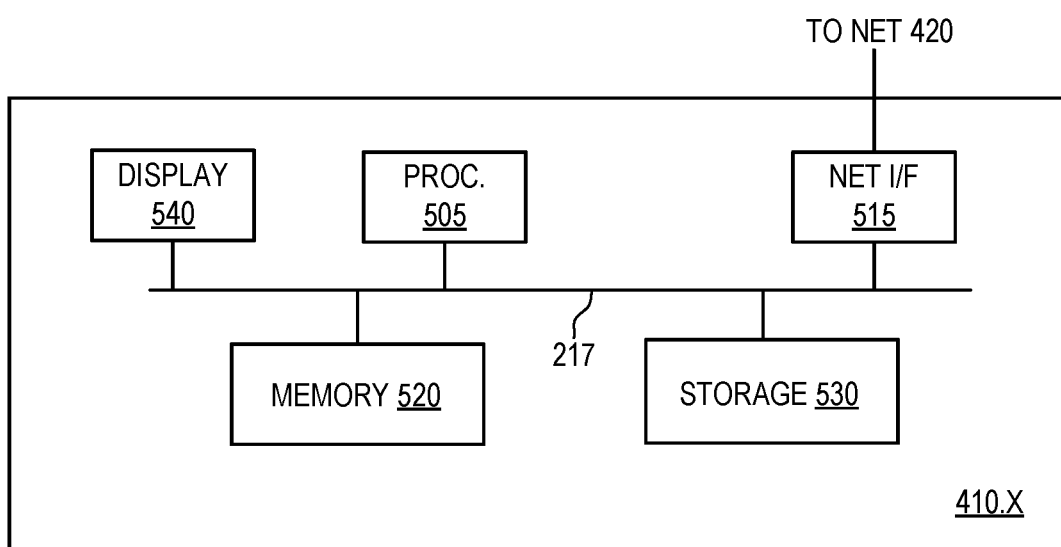
FIG. 5 is a block diagram of a computer system such as those shown in FIG. 4, according to at least one embodiment of the present invention.

Remote computer system 250 may be implemented by a computer system such as illustrated in FIG. 5, for example, and may include program modules configured to perform one or more of the functions described or illustrated herein. It should be appreciated that in addition to the functions of remote computer system 250 explicitly described herein, such as herein above in connection with FIGS. 2 and 3, certain functions described herein above for device 230 or 240 may, alternatively, be suitable for performance by computer system 250. Accordingly, in at least one embodiment of the present invention computer system 250 includes obstruction detection module 852, perspective determination module 854, hazard determination module 856 and communication module 858. (It should be understood that computer system 250 may include additional elements, fewer elements, different elements or differently arranged elements.)

Sensors and sources 831 and 841 include ultrasound source(s) and sensor(s), proximity sensor(s) and camera(s), which provide data received by obstruction detection module(s) 832, 842 and/or 852 for identifying an obstructed portion 226 of an object 220 (FIG. 2), wherein perspective determination module 834, 844 and/or 854 determine what is within the user's view based on object 220 sensing data from at least one of the sensors 831 for a side of the user's hand nearest object 220, wherein device 240 is facing object 220, as determined by perspective determination module 834, 844 and/or 854 based on object 220 sensing data from at least one sensor 841 near the use's eyes, particularly within the user's eye gaze, where by perspective determination module 834, 844 and/or 854 may determine eye gaze based on data from at least one of optical sensor(s) and/or infra-red source(s) and sensor(s) 841 of device 240, which may include camera(s).

Sensors and sources 831 and 841 described above may also provide data to hazard determination module 836, 846 and/or 856 for the module(s) determining whether a hazard exists in the obstructed part 226 of object 220 such as by image analysis to determine whether the obstructed part 226 includes anything sharp, anything above or below a predetermined temperature threshold, exposed wire, bare wire in contrast to insulated portions of wire and vibration or rotation. Sensors and sources 831 and 841 may also include electromagnetic field sensor(s) that provide data to hazard determination module 836, 846 and/or 856 for the module(s) determining whether part 226 includes anything above or below a predetermined voltage threshold and laser source(s) and sensor(s) provide data to hazard determination module 836, 846 and/or 856 for the module(s) determining whether part 226 includes anything vibrating or rotating above a certain predetermined frequency.

Figure 9:
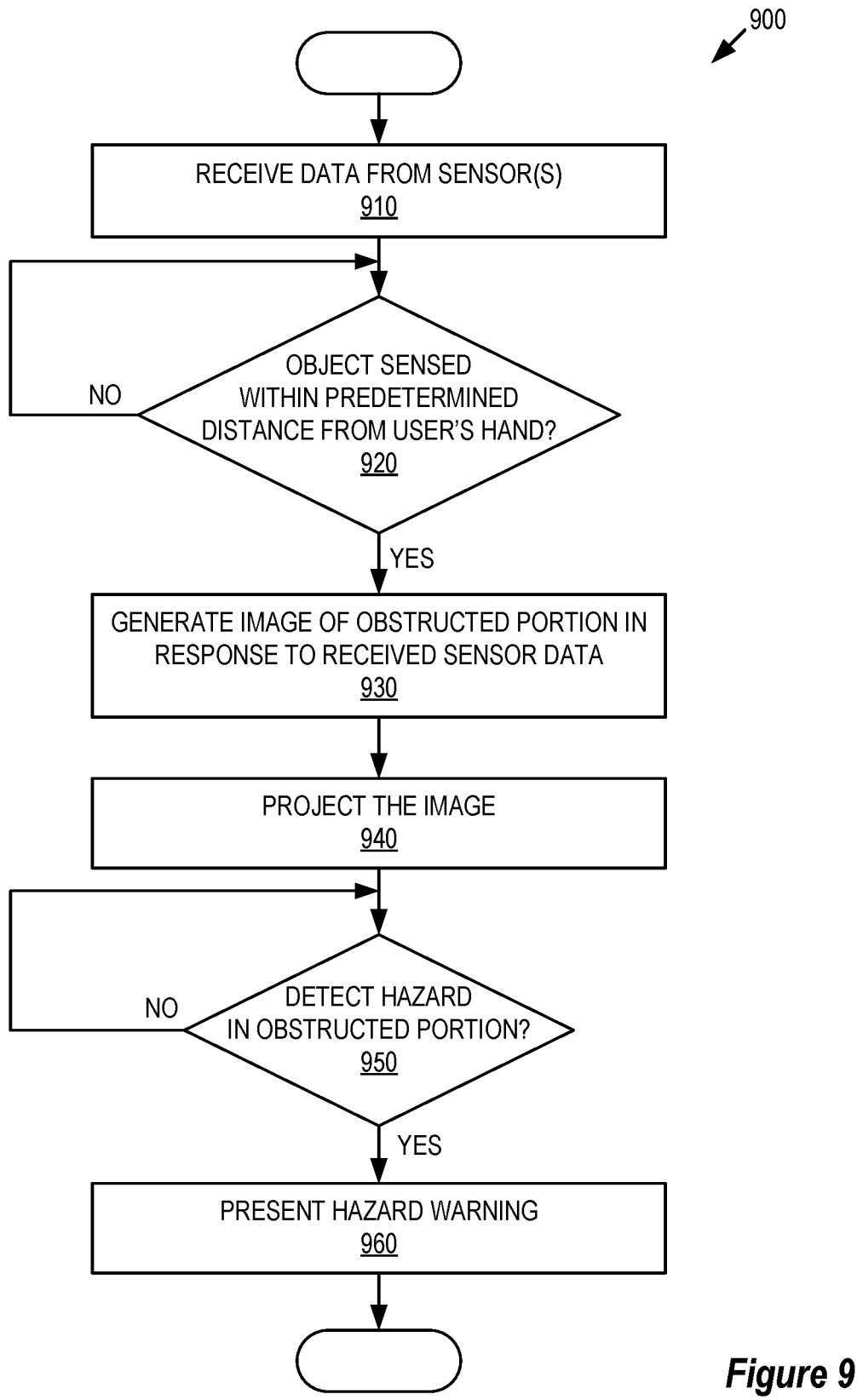
FIG. 9 depicts a computer system implemented method for assistance viewing an object is shown in flow chart fashion, according to at least one embodiment of the present invention.

Referring now to FIG. 9, a computer system implemented method for assistance viewing an object is shown in flow chart fashion, according to at least one embodiment of the present invention. The method includes sensing an object by a ranging sensor(s) fixed to a first wearable device. (The first wearable device is referred to as "wearable" because it is adapted to be worn by a user.) The ranging sensor(s) provide sense data for determining proximity of the object and may be infra-red, ultrasonic, photoelectric, lidar (light detection and ranging) or capacitive, for example. Alternatively, the ranging sensor(s) may be optical, e.g., camera based, and configured to produce optical image data for the object. The ranging sensor(s) provide to the computer system ranging data generated by sensing the object. Correspondingly, the computer system receives 910 the ranging data and determines 920 therefrom how close the object is to a hand of the user. If the object is closer than a predetermined distance from the user's hand, this indicates the object is within reach of the user's hand and it is, therefore, desirable to project an image viewable by the user that shows the obstructed portion of the object.

If the object is closer than the predetermined distance, this may also be used to indicate that part of the object is presumed to be obstructed by the user's hand from the user's view. Alternatively, an image of the object may be generated as described below to determine whether part of the object is obstructed by the user's hand from the user's view.

For generating 930 the image of the obstructed portion of the object, the computer system may be configured to use merely the ranging data, provided that its nature is suited for producing the image, e.g., provided that the sensor that produces the ranging data is lidar or ultrasonic, for example. (The system may possibly be configured to determine proximity even from optical sensor data, in which case optical ranging data may be suited for producing the image.) Alternatively, the computer system may be configured to generate the image of the obstructed portion of the object from the ranging data together with additional sensor data. In yet another alternative, the computer system may be configured to generate the image from data received from one or more other sensors instead of the ranging data from ranging sensor(s).

In at least one embodiment of the present invention, the computer system generates 930 an image of the obstructed portion of the object merely from first data generated by at least one ultrasonic source and sensor fixed to the first wearable device, where the first wearable device is adapted to be worn on a hand of the user with the at least one source and sensor fixed on a side of the hand opposite the user's head. (Herein, "on the hand" includes on the user's wrist.) In at least one such embodiment, the at least one source and sensor of the hand wearable device may be lidar based. In at least one such embodiment, the computer system generates the image that is limited to the obstructed portion of the object merely from first data generated by at least one optical sensor fixed to the hand wearable device.

In at least one embodiment of the present invention, the computer system generates 930 an image that is limited to the obstructed portion of the object both in response to the above described first data and from second data generated by at least one second sensor fixed to a second wearable device, such as a device adapted to be worn on the user's head, e.g., eyeglasses, goggles or a device fixed to a forehead strap. In such an embodiment, the first and second sensors may include respective first and second optical cameras (i.e., optical light sensing cameras), for example, where the first data includes first image data for a first image of the object from the first camera and the second data includes second image data for a second image of the object from the second camera. (The first and second sensors for generating 930 the image that is limited to the obstructed portion of the object may alternatively include respective first and second ultrasonic or lidar sensors fixed to the first and second devices respectively.)

In this alternative, that generates 930 an image that is limited to the obstructed portion of the object, the first image is captured from the object side of the user's hand, which is the opposite side from the user's face. Consequently, the first image includes the portion of the object obstructed by the hand of the user. The second image is captured from the same side of the user's hand as the user's face, so that the user's hand obstructs the user's view of the object and, correspondingly, the view of the sensor(s) of the head wearable, second wearable device. Consequently, the second image does not include the portion of the object obstructed by the hand of the user, and the portion of the first image not included in the second image shows the obstructed portion of the object. The computer system compares the first and second image data and generates, as the image limited to the obstructed portion of the object, the portion of the first image not included in the second image.

Once the computer system has generated the image of the obstructed portion of the object, the image is projected 940 onto a surface viewable by the user, such as by a projector of the first device configured to project the image onto the back of the user's hand. Since the object is closer than the predetermined distance from the user's hand and, therefore, reachable by the hand, the system is configured to also detect 950 whether the obstructed part of the object presents a hazard to the user's hand, as has been described herein. Responsive to detecting 950 that there is such a hazard, the system is configured to provide a warning action for the user, as has been described herein, which may include a hazard warning to the user via the projected image of the obstructed portion as has been described, which may include presenting a magnified part of the projected image of the obstructed portion, wherein the magnified part shows a hazardous part of the obstructed portion of the object, as shown in FIG. 3, for example.

Figure 4:
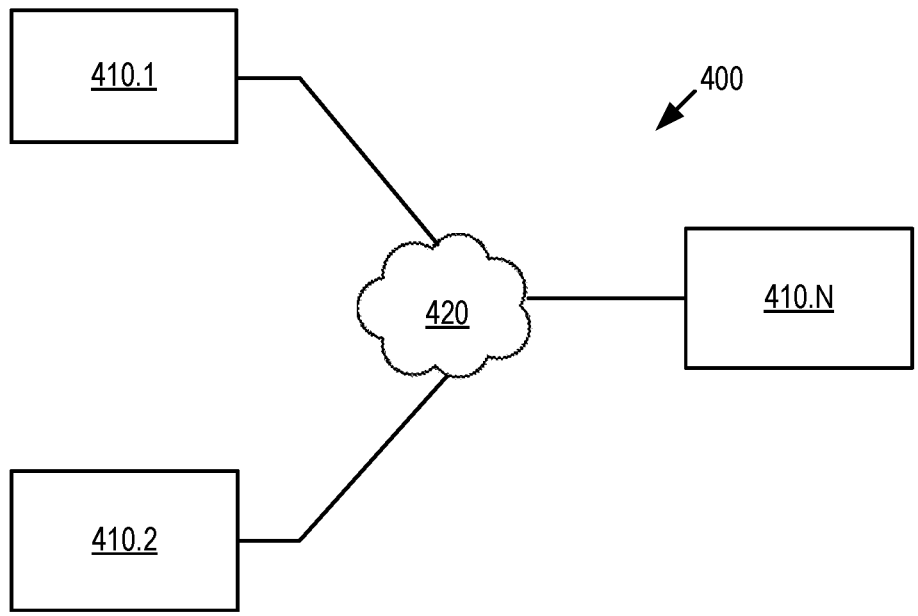
FIG. 4 illustrates a networked computer environment, according to at least one embodiment of the present invention.

FIG. 4 illustrates an example computing environment 400 suitable for embodiments of the present invention. As shown, computing environment 400 includes computer systems 410.1, 410.2 through 410.N connects via network 420, which may be a public or private network. Systems 410.1, 410.2, etc. include modules, which may be program or hardware modules, configured to perform tasks for their own respective systems or for other systems or both, including tasks as described for elements of FIGS. 1 through 3 herein.

FIG. 5 illustrates details of a computer system 410.X suitable as computer systems 410.1, 410.2, etc. according to embodiments of the present invention, wherein system 410.X includes at least one central processing unit (CPU) 505, network interface 515, interconnect (i.e., bus) 517, memory 520, storage device 530 and display 540. CPU 505 may retrieve and execute programming instructions stored in memory 520 for applications. Similarly, CPU 505 may retrieve and store application data residing in memory 520. Interconnect 517 may facilitate transmission, such as of programming instructions and application data, among CPU 505, storage 530, network interface 515, and memory 520. CPU 505 is representative of a single CPU, multiple CPUs, a single CPU having multiple processing cores, and the like. Additionally, memory 520 is representative of a random-access memory, which includes data and program modules for run-time execution. It should be understood that system 410.X may be implemented by other hardware and that one or more modules thereof may be firmware.

The following provides a detailed description of aspects concerning a cloud computing embodiment of the present invention. It is to be understood that although this disclosure includes this detailed description regarding cloud computing, implementation of the teachings recited throughout this application are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portility (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
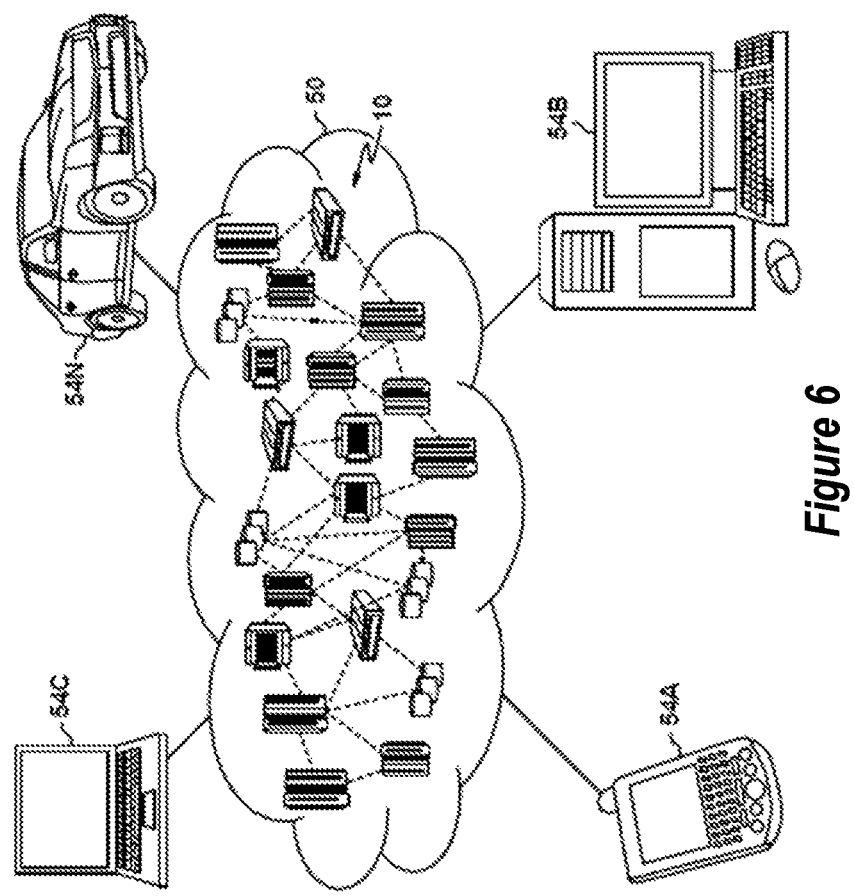
FIG. 6 depicts a cloud computing environment, according to at least one embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
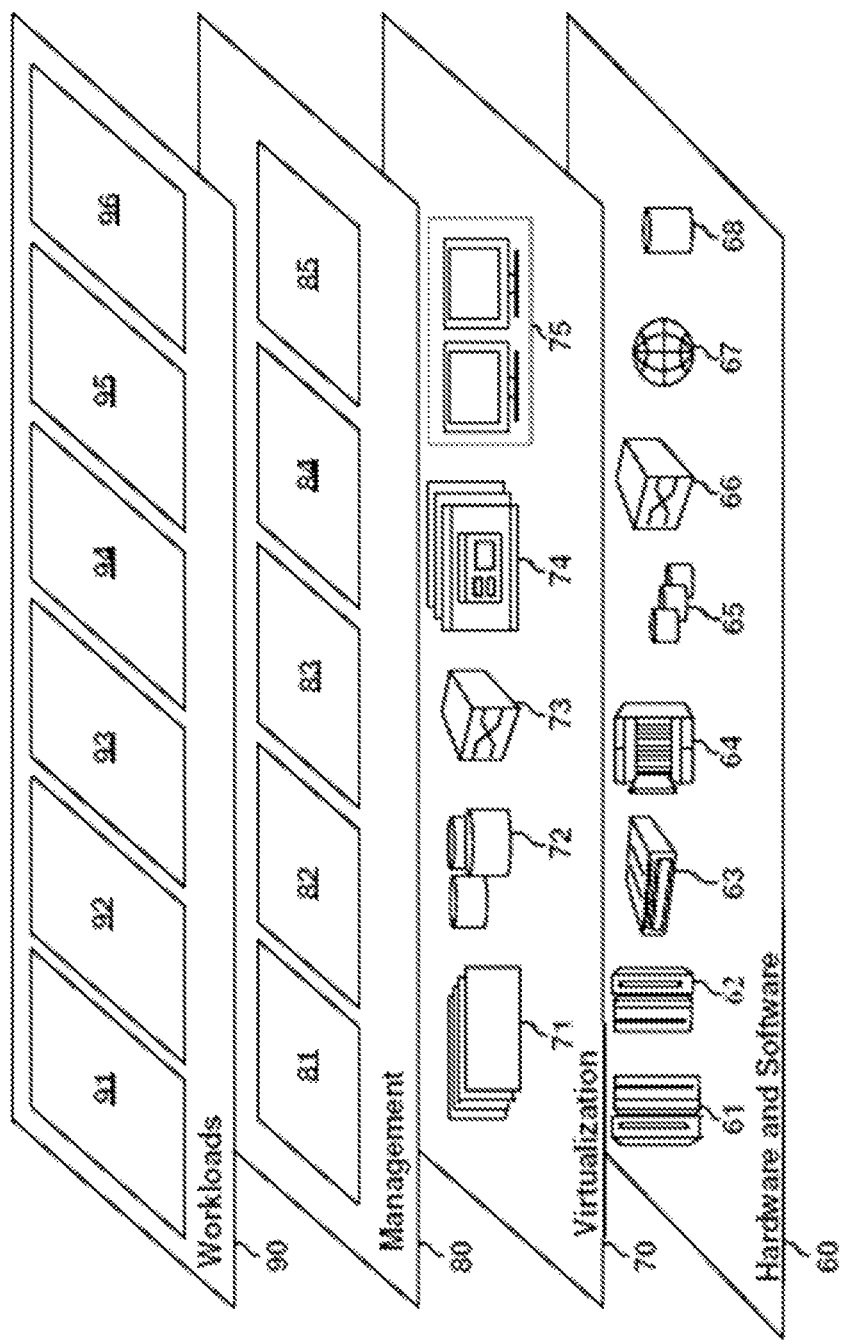
FIG. 7 depicts abstraction model layers, according to at least one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assistance viewing an object 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. Reference herein to a "procedure" is not necessarily intended to indicate implementation of invention embodiments in a procedural language.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Also, although features can be described above as acting in certain combinations and even initially claimed as such, features from a claimed combination can in some cases be excised from the combination, and the claimed combination directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Likewise, the actions recited in the claims can be performed in a different order and still achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as claimed.

It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

What is claimed is:

1. A method for assistance viewing an object, the method comprising:
    receiving, by a computer system, first data from a first sensor sensing an object when a user's view of at least a portion of the object is obstructed by a hand of the user, wherein the first sensor is fixed to a first wearable device;
    generating, by the computer system, an image of the obstructed portion of the object in response to the first data;
    projecting the image of the obstructed portion of the object onto a surface within a view of the user; and
    detecting, by the computer system, that the obstructed portion of the object includes a hazard to the user and responsively presenting a hazard warning to the user showing a magnified, hazardous part of the projected image.

2. The method of claim 1 comprising:
    receiving, by the computer system, second data from a second sensor sensing the object when the user's view of the at least portion of the object is obstructed by the hand of the user, wherein the second sensor is fixed to a second wearable device;
    wherein the generating, by the computer system, the image of the obstructed portion of the object is further in response to the second data.

3. The method of claim 2, wherein:
    the first and second sensors include respective first and second optical cameras;
    the first data includes first image data for a first image of the object from the first optical camera and the second data includes second image data for a second image of the object from the second optical camera;
    the first image includes the portion of the object obstructed by the hand of the user and the second image does not include the portion of the object obstructed by the hand of the user; and
    the generating the image of the obstructed portion of the object includes the computer system comparing the first and second image data.

4. The method of claim 1, wherein:
    the first sensor includes an ultrasonic sensor; and
    the first sensor sensing the object includes first sensor sensing in response to an ultrasonic source fixed to the first wearable device.

5. The method of claim 1, wherein the first wearable device is adapted for wearing on a hand of the user.

6. The method of claim 5, wherein the projecting is by a projector of the first wearable device, the projector being configured for projecting onto a surface of the user's hand, within the view of the user.

7. The method of claim 1, wherein the first wearable device is adapted for wearing on the user's head.

8. The method of claim 1, wherein the computer system is located on the first wearable device.

9. The method of claim 1, wherein the computer system is remote from the first wearable device.

10. A system for assistance viewing an object, the system comprising:
    a first sensor fixed to a first wearable device;
    a computer system comprising a processor; and
    a computer readable storage medium connected to the processor, wherein the computer readable storage medium has stored thereon a program for controlling the processor, and wherein the processor is operative with the program to execute the program for:
        receiving, by the computer system, first data from the first sensor sensing an object when a user's view of at least a portion of the object is obstructed by a hand of the user;

generating, by the computer system, an image of the obstructed portion of the object in response to the first data;

projecting the image of the obstructed portion of the object onto a surface within a view of the user; and detecting, by the computer system, that the obstructed portion of the object includes a hazard to the user and responsively presenting a hazard warning to the user showing a magnified, hazardous part of the projected image.

11. The system of claim 10, comprising:

a second sensor fixed to a second wearable device, wherein the processor is operative with the program to execute the program for:

receiving, by the computer system, second data from the second sensor sensing the object when the user's view of the at least portion of the object is obstructed by the hand of the user;

and wherein:

the generating, by the computer system, the image of the obstructed portion of the object is further in response to the second data;

the first and second sensors include respective first and second optical cameras; and the first data includes first image data for a first image of the object from the first optical camera and the second data includes second image data for a second image of the object from the second optical camera;

the first image includes the portion of the object obstructed by the hand of the user and the second image does not include the portion of the object obstructed by the hand of the user; and the generating the image of the obstructed portion of the object includes the computer system comparing the first and second image data.

12. The system of claim 10, wherein:

the first sensor includes an ultrasonic sensor; and the first sensor sensing the object includes first sensor sensing in response to an ultrasonic source fixed to the first wearable device.

13. The system of claim 10, wherein the first wearable device is adapted for wearing on a hand of the user.

14. The system of claim 10, wherein the projecting is by a projector of the first wearable device, the projector being configured for projecting onto a surface of the user's hand, within the view of the user.

15. The system of claim 10, wherein the first wearable device is adapted for wearing on the user's head.

16. The system of claim 10, wherein the computer system is located on the first wearable device.

17. The system of claim 10, wherein the computer system is remote from the first wearable device.

18. A computer program product for assistance viewing an object, the computer program product comprising a non-transitory computer readable storage medium having program instructions embodied therewith, the program instructions executable by a processor to cause the processor to:

receive, by a computer system, first data from a first sensor sensing an object when a user's view of at least a portion of the object is obstructed by a hand of the user, wherein the first sensor is fixed to a first wearable device; generate, by the computer system, an image of the obstructed portion of the object in response to the first data; and project the image of the obstructed portion of the object onto a surface within a view of the user; and detecting, by the computer system, that the obstructed portion of the object includes a hazard to the user and responsively presenting a hazard warning to the user showing a magnified, hazardous part of the projected image.

19. The computer program product of claim 18, wherein the program instructions are executable by a processor to cause the processor to:

receive, by the computer system, second data from a second sensor sensing the object when the user's view of the at least portion of the object is obstructed by the hand of the user, wherein the second sensor is fixed to a second wearable device; and wherein:

the generating, by the computer system, the image of the obstructed portion of the object is further in response to the second data;

the first and second sensors include respective first and second optical cameras;

the first data includes first image data for a first image of the object from the first optical camera and the second data includes second image data for a second image of the object from the second optical camera;

the first image includes the portion of the object obstructed by the hand of the user and the second image does not include the portion of the object obstructed by the hand of the user; and the generating the image of the obstructed portion of the object includes the computer system comparing the first and second image data.

20. The computer program product of claim 18, wherein:

the first sensor includes an ultrasonic sensor; and the first sensor sensing the object includes first sensor sensing in response to an ultrasonic source fixed to the first wearable device.

* * * * *